C. L. BAIR.
BODY IRON FOR VEHICLE BODIES AND BUCKLE THEREFOR.
APPLICATION FILED SEPT. 30, 1918.
1,290,483.
Patented Jan. 7, 1919.
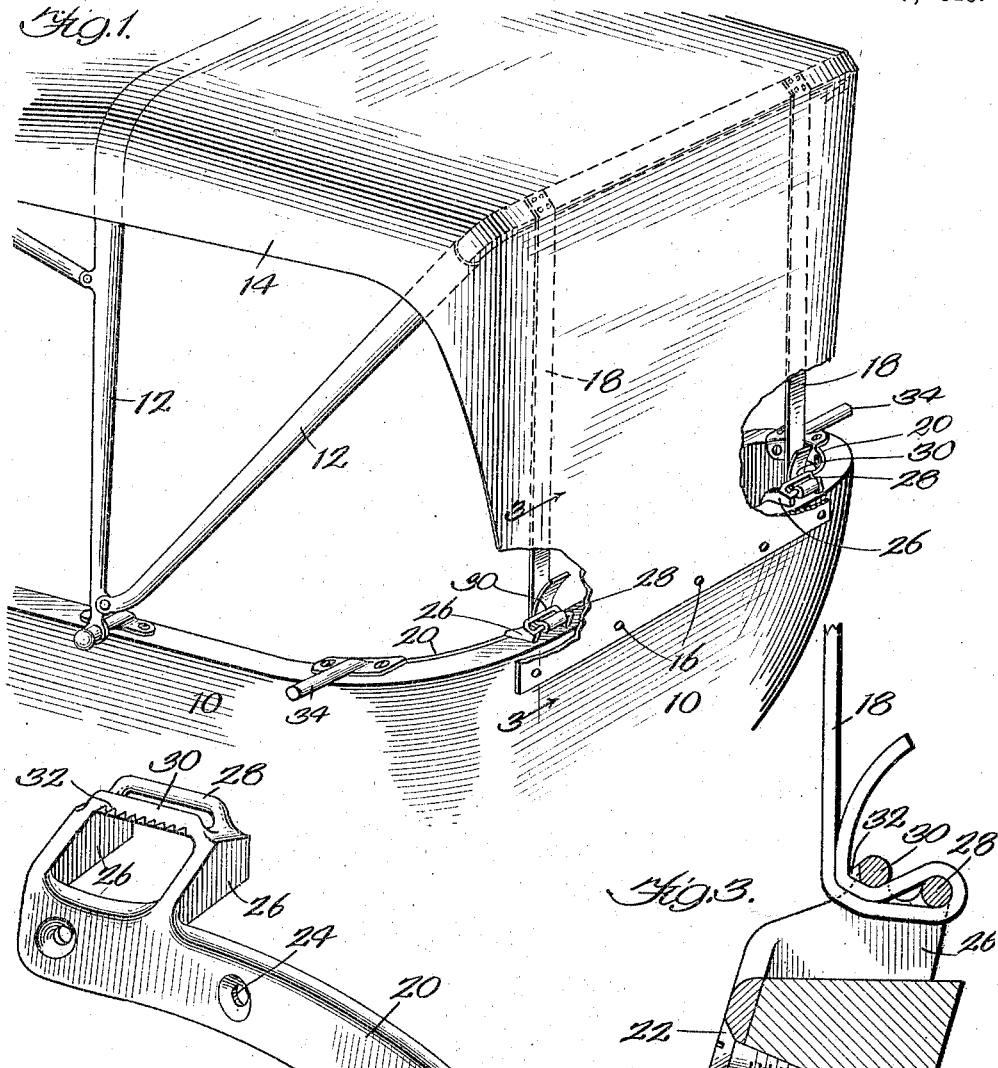
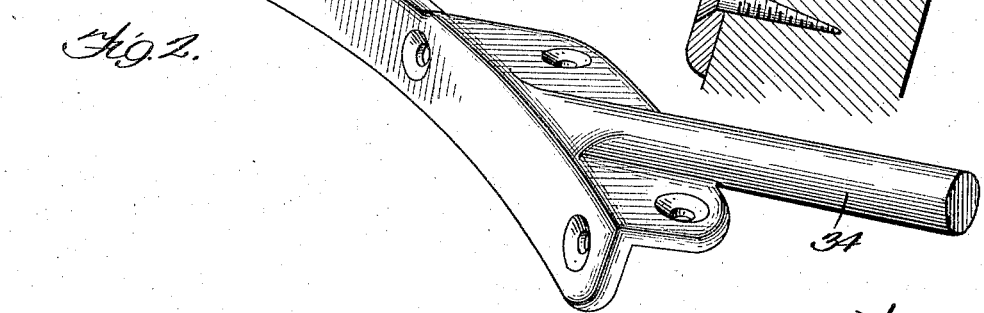
Inventor:
Clarence L. Bair.
By Cheever & Cox
Attys

UNITED STATES PATENT OFFICE.

CLARENCE L. BAIR, OF ST. JOSEPH, MICHIGAN, ASSIGNOR TO AUTO SPECIALTIES MANUFACTURING CO., OF SAN FRANCISCO, CALIFORNIA, A CORPORATION OF CALIFORNIA.

BODY-IRON FOR VEHICLE-BODIES AND BUCKLE THEREFOR.

1,290,483.  Specification of Letters Patent.  Patented Jan. 7, 1919.

Application filed September 30, 1918. Serial No. 256,194.

*To all whom it may concern:*

Be it known that I, CLARENCE L. BAIR, a citizen of the United States, residing at St. Joseph, in the county of Berrien and State of Michigan, have invented a certain new and useful Improvement in Body-Iron for Vehicle-Bodies and Buckle Therefor, of which the following is a specification.

This invention is a body iron for the body of an automobile, equipped with means for supporting a vehicle bow top holder and with means for adjustable connection with the top of the automobile. The object of the invention is to provide a body iron of this class and to provide a buckle thereon by which the adjacent strap which ordinarily connects the rear of the automobile top with the automobile body in order to reduce the strain upon the cover material may be readily, positively and progressively adjusted without injury to the strap which injury takes place where ordinary tongue buckles are used and it is attempted to have holes therefor placed close together so as to provide ready gradual adjustment.

The invention consists in mechanism capable of carrying out the foregoing objects, which can be easily and cheaply made, which is satisfactory in operation and is not readily liable to get out of order. More particularly, the invention consists in the features and details of construction which will be hereafter more fully set forth in the specification and claims.

Referring to the drawings, in which similar numerals indicate the same parts throughout the several views, Figure 1 is a perspective view of an automobile body and top therefor, the two being connected together through the agency of mechanism illustrating this invention in its preferred form.

Fig. 2 is a perspective view of the body iron of this invention removed from the vehicle body.

Fig. 3 is a side view of the buckle and attached strap partly in section, taken on the line 3 of Fig. 1.

For purposes of illustrating the application of the device of this invention, a conventional form of automobile body 10, equipped with top bows 12 and a top covering 14 of ordinary construction is shown in Fig. 1, this top covering being, as usual, attached by any suitable means, such as tacks 16, to the rear of the automobile body. As is well understood in the art, ordinary securing devices, such as tacks 16, are not sufficient support for securing connection between the body 10 and the rear bow 12 of the top, and if no other support is provided, the weight and movement of the top as a whole will very shortly pull out the tacks 16 or other securing devices. For this reason it has long been the practice to interpose between the body 10 and the rear bow 12 one or more, usually two, straps 18, attached at the top to the bow 12 and at the bottom to the rear of the automobile body 10. In previous practice, an ordinary tongue buckle has usually been interposed in the middle of each such strap or straps adapted to be detachably placed in a plurality of holes placed along the strap in the ordinary manner, to take up slack in the strap or straps as wear takes place in the automobile top. In practice, the amount of adjustment in the length of the straps required is less than the distance which can be interposed between two successive holes in the straps without weakening them too much, so that the straps tear or break at or adjacent to said holes.

In order to do away with the disadvantages set forth, the straps 18 here used are each made in one continuous piece, while the vehicle body 10 is provided with a body iron 20, one for each strap, adapted to be inserted inside of each rear corner of the vehicle body and secured thereto by any suitable means, as for instance by screws 22 passing through holes 24. On the end of the body iron 20 just below and adjacent to strap 18 is provided a buckle frame 26 of the peculiar construction shown in the drawings, in which there are two parallel, spaced apart, cross bars 28 and 30, preferably arranged in the same horizontal plane so that they are together in a plane substantially perpendicular to the line of tension on the main body of the adjacent strap 18. The edge of cross bar 30 which is adjacent to the vertical line of strap 18 is provided with serrations 32 adapted to engage and hold the strap.

In attaching each strap to the adjacent buckle, it is brought down past the teeth 32, thence passed under both bars 30 and 28, thence over bar 28, thence under bar 30, past and in contact with the teeth 32 to separate said teeth from the main portion of the strap, all as shown in Fig. 3. The result of this construction is that upward pull upon the main portion of strap 18 tends to force the end portion of strap 18 more and more strongly into mesh with teeth 32, with the result that the strap is rigidly locked upon the buckle.

When it is desired to adjust (tighten or loosen) a strap 18, the operator takes hold of the rear bow 12 and pulls it toward the back of the vehicle until the whole strap mechanism is loose enough to permit the operator to, by hand, adjust the strap device in either direction over the bars 28 and 30 to the new position desired, after which the operator lets go of the top, and the weight of the top then pulls the strap 18 upward to relock its end in the buckle, in the manner described.

On the other end of the body iron 20, and preferably cast integral therewith is an arm 34, adapted to receive and position a vehicle bow top holder of any suitable type, for instance, that shown in United States Patent No. 1,010,110, intended to detachably secure the bows 12 of the top in selected position when the top is lowered. It is important for the proper operation of the entire device in a satisfactory manner that the bow top holder be correctly positioned with reference to the top and consequently the strap 18 and that the top be properly adjusted through the manipulation of the strap 18 in connection with the buckle device heretofore described.

In the particular construction here illustrated, one body iron 20 is located at each rear corner of the vehicle so as to support the top device by two straps 18. More or less than two such straps may be used without departing from the spirit of this invention.

Having thus described my invention what I claim as new and desire to secure by Letters Patent, is:—

1. A vehicle body iron securable at a corner of the vehicle, having integral therewith a rod projecting to the side of the vehicle for the purpose of receiving a vehicle bow top holder and having projecting at the rear of the vehicle a buckle device for the purpose of receiving therethrough and holding a strap attached to the top of the vehicle.

2. As an article of manufacture, a body iron 20 curved to fit the corner of a vehicle body having projecting from one end a member 34 adapted to receive a vehicle bow top holder and having projecting from the other end a buckle body 20, equipped with cross bars 28 and 30, the whole arranged and disposed as shown and described, for the purposes set forth.

In witness whereof, I have hereunto subscribed my name in the presence of two witnesses.

CLARENCE L. BAIR.

Witnesses:
 DWIGHT B. CHEEVER,
 M. S. ROSENZWEIG.